United States Patent Office 2,846,979
Patented Aug. 12, 1958

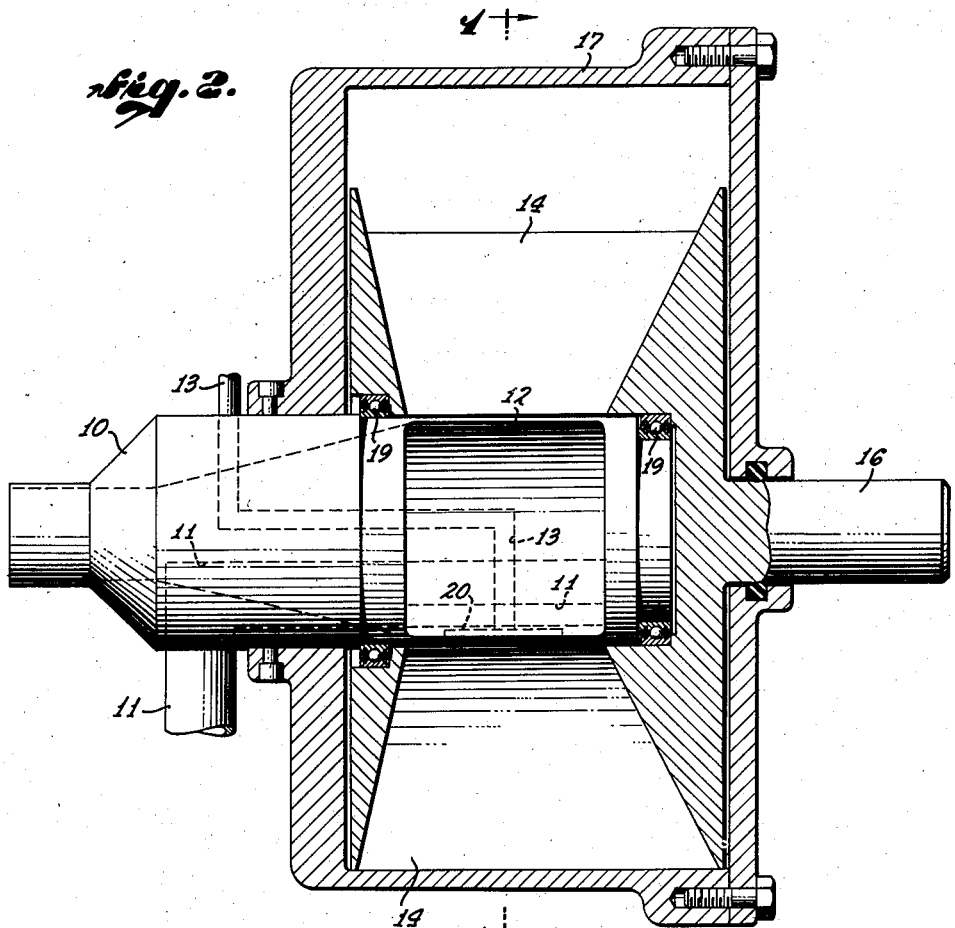
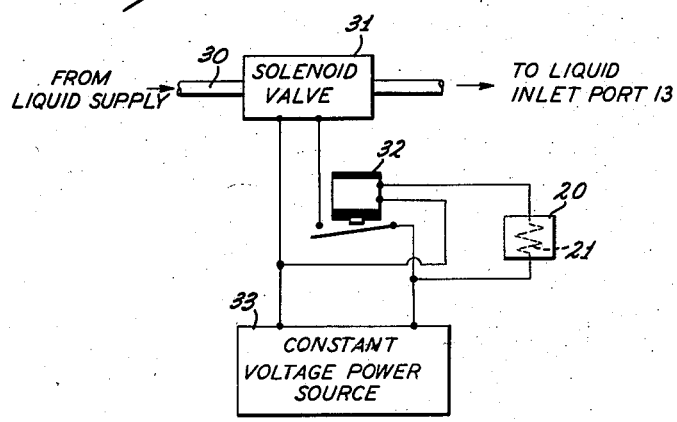

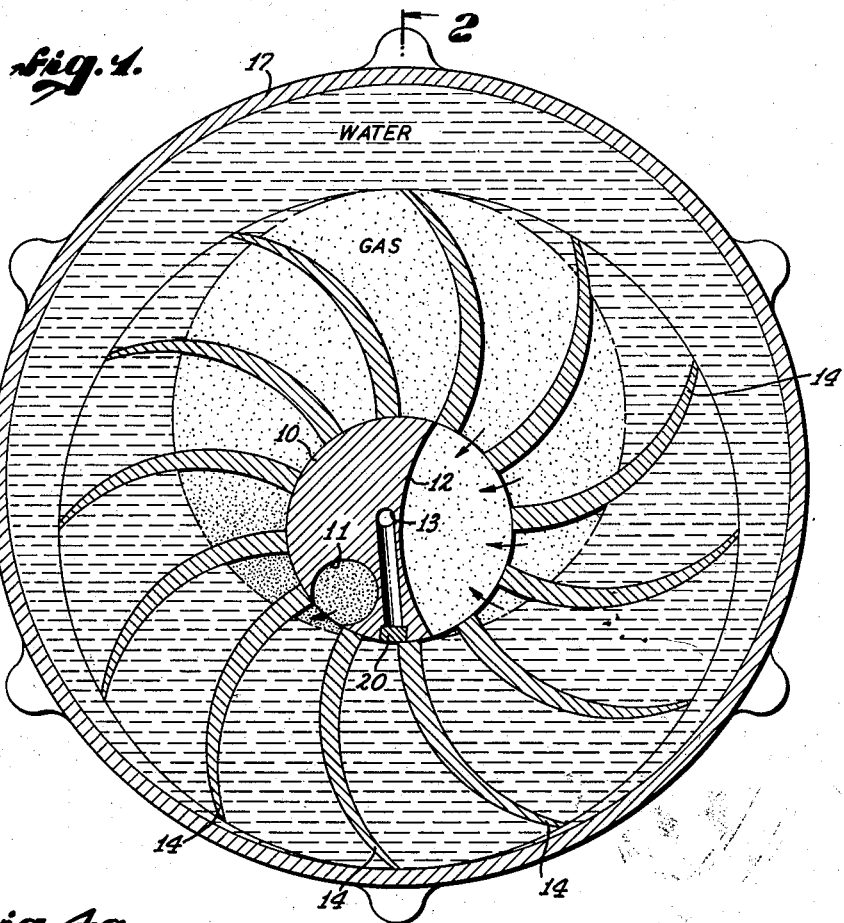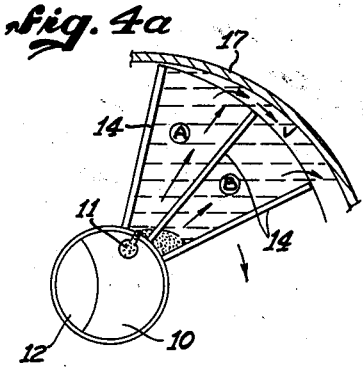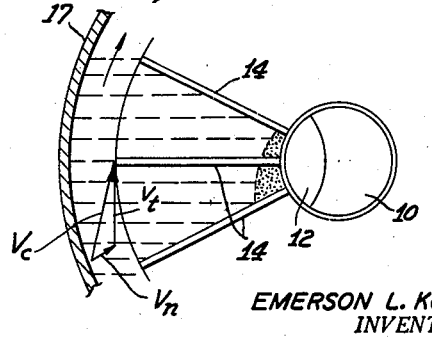

2,846,979

LIQUID PISTON EXPANSIBLE CHAMBER MOTOR CONTROL SYSTEM

Emerson L. Kumm, Pacific Palisades, Calif., assignor to Propulsion Research Corporation, Santa Monica, Calif., a corporation Application April 4, 1956, Serial No. 576,184

8 Claims. (Cl. 121—1)

The present invention relates to liquid piston expansible chamber motor control system, and it relates more particularly to a control system for a liquid piston gas turbine for maintaining the correct amount of liquid in such a turbine.

A liquid piston turbine has recently been developed in which a plurality of turbine vanes rotate around a stationary shaft in response to a driving gas which is introduced between the vanes from an inlet port in the shaft. The gas is trapped between the vanes by a body of liquid that surrounds the vanes and rotates therewith, and the gas is later discharged through an outlet or exhaust port in the shaft. This turbine is capable of generating shaft power from a high pressure gas more efficiently than prior art turbines, especially in applications requiring low rotational speeds from units of smaller diameter and volume. Moreover, the liquid surrounding the vanes and acting as a piston in the spaces therebetween also functions as a convenient cooling means for the turbine, and it further enables a higher temperature gas to be used for increased turbine efficiency than was possible with prior art uncooled turbines.

A problem has arisen in turbines of the type described in the preceding paragraph in maintaining the proper amount of liquid in the turbine. It has been found that the turbine operates most efficiently when the gas-liquid interface touches the periphery of the stationary shaft between the outlet and inlet ports therein after the trapped gas has been discharged through the exhaust port. To maintain the desired condition in which the liquid-gas interface just touches the periphery of the stationary shaft, between the outlet and inlet ports, the liquid must be replenished from time to time to make up for the liquid lost by evaporation and by entrainment in the exhaust gases.

It is, accordingly, an object of the present invention to provide an improved control system for the liquid supply of a liquid piston gas turbine, or the like, which will maintain the proper amount of liquid in the turbine at all times for optimum operating efficiency thereof.

The various features and advantages of the present invention will be readily understood from the following detailed description taken with the accompanying drawings.

In the drawings, which are to be regarded as merely illustrative:

Figure 1 is a schematic cross-sectional view of a gas turbine incorporating the control system of the invention:

Figure 2 is an elevational view of the turbine, partly in section;

Figure 3 is a schematic representation of the control system of the invention; and Figures 4a and 4b are schematic fragmentary representations of the turbine and are useful in explaining the operating principles upon which the turbine is predicated.

As described above, the control system of the invention is intended to be used in a liquid piston gas turbine. Such a turbine comprises a stationary shaft, a plurality of radial vanes rotatably mounted on the shaft, and an outer housing surrounding and enclosing the vanes. The stationary shaft has an inlet port thereon for introducing a gas in the space between successive pairs of vanes passing the inlet port, and an outlet port is also formed in the stationary shaft diametrically opposite the inlet port for exhausting the gas from between successive pairs of vanes as they pass the outlet port. The stationary shaft also has a further inlet port for introducing a liquid into the housing, which liquid surrounds the vanes and functions as a piston to trap the gas in the spaces between the vanes. In this turbine, and for maximum efficiency, one peripheral portion of the stationary shaft is contacted by the gas and another portion is contacted by the gas-liquid interface.

The control system of the present invention is intended to control the liquid supplied to the turbine to maintain the gas-liquid interface so that it just touches the peripheral portion of the stationary shaft between the outlet and inlet ports. The control system includes a solenoid operated valve in the line that supplies the liquid to the liquid inlet port, and a moisture sensitive element mounted on the peripheral portion of the stationary shaft between the outlet and inlet ports for controlling the valve so as to open the same whenever that peripheral portion is contacted by gas instead of liquid. This increases the liquid in the housing and reestablishes the liquid contact on this peripheral portion of the shaft.

The illustrated liquid gas turbine includes a stationary shaft or hub 10. A gas inlet port 11 extends through the shaft 10 and terminates in the interior of the turbine at a point on the periphery of the shaft. In addition, a gas outlet or exhaust port 12 extends through the shaft 10 and terminates in the interior of the turbine at a point on the periphery of the shaft substantially diametrically opposite to the terminating point of the inlet port. A liquid inlet port 13 also extends through shaft 10, and this inlet port terminates in the interior of the turbine at a point on the periphery of the shaft between the gas inlet and gas exhaust ports referred to above.

A plurality of turbine vanes 14 are supported by a suitable end disc in fixed angular positions with respect to one another and for rotation about the stationary shaft 10. A rotatable drive shaft is driven by rotation of the vanes. The outer casing or housing 17 of the turbine is mounted on the stationary shaft 10 and a sealed bearing 19 is disposed between the stationary shaft 10 and the drive shaft 16.

As best shown in Figure 1, suitable gas is introduced at substantially constant pressure into the turbine through inlet port 11 and into the spaces between successive pairs of vanes as the vanes pass this port. A liquid, such as water, is introduced into the turbine through the liquid inlet port 13, and this liquid forms a liquid body that rotates with the vanes and surrounds the spaces therebetween to trap the gas therein. Therefore, as each vane passes the inlet port 11, the gas flows in the space between it and the next succeeding vane and is trapped therein by the liquid which acts as a piston. The gas expands in each such space causing the vanes to rotate and pushing back the liquid piston as shown in Figure 1.

The operation of the turbine may best be explained by reference to Figures 4a and 4b. Figure 4a is a schematic fragmentary sectional view of the turbine rotor at the point of entry of the high pressure gas through the inlet port 11. Figure 4b is a schematic fragmentary view of the turbine rotor at a position displaced angularly by 270° from the entry position of Figure 4a.

The actual force causing the turbine rotor to rotate and do work is the recovery by the rotor of the tangential velocity imparted to the surrounding liquid by the pressure of the inlet gas. This recovery is not effected at the rotor cavity when it is positioned at the point of entry of the gas. Instead, the liquid is forced out of the cavity in this position and against the turbine casing. The liquid subsequently re-enters the rotor due to the eccentric relation between the rotor and the casing. It is this re-entry of the liquid into the rotor that performs the useful work on the rotor, as will be described.

An additional velocity component V relative to the tip of the rotor vanes is produced in the surrounding liquid by the pressure gradiant as between the cavity A and the cavity B in Figure 4b. The gas pressure in the cavity A may, for example, be of the order of 120 p.s.i., but due to expansion the gas pressure in the cavity B is lower and may have a value of, for example, 100 p.s.i. The net pressure differential will produce a liquid flow through the only available space between these cavities. That is, liquid will flow across the space between the tip of the vane separating the cavity A from the cavity B, on one hand, and the inner surface of the casing 17 on the other hand.

The resulting velocity V does not react against the vanes 14 in Figure 4a adjacent the gas inlet port to any appreciable extent, but its action is against the inner surface of the casing 17. That is, the major portion of the tangential velocity is imparted to the liquid piston beyond the tip of the vane separating the cavity A from the cavity B in Figure 4a. In this manner, counteracting forces on the turbine rotor at that point are reduced to a minimum.

The liquid piston in the casing 17, therefore, has an additional velocity vector V imparted to it by virtue of the pressure differential between successive rotor cavities adjacent the gas inlet port such as the cavities A and B. This velocity vector enters the rotor at the other side of the turbine, as shown in Figure 4b. It is this entering of the liquid piston into the rotor that causes the turbine rotor to rotate in a clockwise direction as shown in Figure 4b and to produce useful work.

Figure 4b, as noted above, shows a rotor position angularly displaced 270° from the illustrated position of Figure 4a. In Figure 4b, $V_c$ is the velocity of the liquid piston traveling around the casing in a clockwise direction in Figure 4b. $V_t$ is the tip velocity of the turbine rotor. $V_c$ is greater than $V_t$ by the pressure velocity increase V described above. Therefore, the net velocity of the liquid piston relative to the rotor may be indicated by the vector $V_n$ in Figure 4b.

The vector $V_n$ will turn towards the center of the assembly and be dissipated so that there remains only a small radial velocity component for continued flow of the liquid around the annular space in the turbine. This turning of the vector $V_n$ produces the useful work on the turbine rotor to produce the clockwise torque as viewed in Figures 4a and 4b.

A liquid piston gas turbine such as that described in the preceding paragraphs is described and claimed in copending application Ser. No. 605,801 which was filed August 23, 1956 in the name of Emerson L. Kumm et al.

The gas-liquid interface is constrained to have an annular configuration eccentric with the stationary shaft 10 and axis of rotation of the vanes 14. As noted previously herein, maximum efficiency of the turbine is realized when the gas-liquid interface just touches a peripheral portion of shaft 10 between the outlet port 12 and inlet port 11 after the gas has been discharged through the outlet port.

To realize the control of the present invention, a moisture-sensitive element 20 is mounted on shaft 10 and insulated electrically and thermally from the shaft. This element is positioned on the periphery of shaft 10 to correspond to the position where it is desired that the liquid-gas interface touch the periphery. The element contains a temperature-sensitive resistor 21 (Figure 3), and when the element 20 is covered by the liquid, the resistor 21 is maintained in a relatively cool condition to exhibit a relatively low resistance. However, when the element 20 is not covered with the liquid but is surrounded by the gas, the temperature of the resistor increases and, as a result thereof, its resistance increases.

As shown in Figure 3, the liquid is supplied to the inlet port 13 through a pipe line 30 which has a solenoid-operated valve 31 therein. The solenoid-operated valve is controlled by a relay 32, the solenoid of the valve being connected to a constant voltage power source 33 through a pair of normally-open contacts of the relay. The actuating coil of the relay is also energized from the source 33 and through the moisture-sensitive element 20.

So long as the liquid is in contact with the peripheral portion of shaft 10 at which element 20 is positioned, resistor 21 is maintained relatively cool and its resistance is relatively low. Relay 32 is a current-sensitive type, and it is designed so that so long as the resistance of the resistor 21 is relatively low, the current through the relay exceeds its threshold and the relay is energized to close its normally-open contacts. The closure of the relay contacts energizes the solenoid valve and closes that valve to cut off the supply of the liquid to the liquid inlet port 13 of the turbine. Thereafter, no liquid is fed to the turbine so long as the peripheral portion of the shaft 10 at which element 20 is positioned remains covered with the liquid.

Due to evaporation and losses through the exhaust port, the quantity of liquid in the turbine will decrease in time. This results in the peripheral portion of shaft 10 at which element 20 is positioned being no longer covered with the liquid. Resistor 21 now begins to heat up and its resistance becomes relatively high. The system is designed so that in the latter condition of resistor 21, the current through relay 32 falls below the threshold required to hold its contacts closed. The contacts of the relay, therefore, open to deenergize the solenoid valve 31 and open the line 30. This permits liquid to flow to the turbine, and this flow continues until the peripheral portion of shaft 10 adjacent element 20 is again covered with the liquid to cool resistor 21 and thereby cause the relay to close valve 31. In this manner, the correct amount of liquid is maintained in the turbine.

The invention provides therefore, a simple, automatic control for keeping the liquid-gas interface in a liquid piston gas turbine at the proper position with respect to the periphery of the central shaft of the turbine for optimum turbine efficiency.

My description in specific detail of selected embodiments of the invention will suggest to those skilled in the art various changes, substitutions and other departures from my disclosure that properly lie within the spirit and scope of the appended claims.

I claim:

1. In a liquid piston turbine which comprises a stationary shaft, a plurality of radial vanes rotatably mounted on the shaft, and an outer housing surrounding and enclosing the vanes; which stationary shaft has an inlet port therein for introducing a gas between successive pairs of the vanes passing such port and an outlet port therein opposite the inlet port for exhausting the gas from between successive pairs of the vanes passing such outlet port, and which stationary shaft has a further inlet port therein for introducing a liquid into the housing to surround the vanes and trap the gas therebetween; whereby a first portion of the periphery of the stationary shaft is normally contacted by the gas and a second portion of the periphery of the stationary shaft is normally contacted by the liquid; the combination of: a line for supplying a liquid to the further inlet port; a solenoid-operated valve in said line; and a moisture-sensitive element mounted on the second portion of the periphery of the stationary shaft for controlling said valve to open the same whenever such second portion is contacted by gas so as to increase the liquid in the housing and re-establish the liquid contact of such second portion.

2. The combination defined in claim 1 and which further includes a relay for controlling the energization of said solenoid-operated valve to open said valve whenever the current through said relay drops below a threshold value, and in which said moisture-sensitive element includes a resistor means connecting said relay to an energizing source, the resistance of said resistor means increasing whenever the moisture-sensitive element is not covered by the liquid so as to decrease the current through said relay below said threshold value and open said solenoid-operated valve until the liquid contact of the second peripheral portion of the shaft is restored.

3. In a gas turbine, or the like, which includes a shaft having a first peripheral portion normally contacted by a gas and having a second peripheral portion normally contacted by a liquid, the combination of: a line for supplying a liquid to the turbine; a solenoid-operated valve in said line; and a control element mounted on the second peripheral portion of the shaft for controlling the solenoid-operated valve to open the same whenever such second peripheral portion of the shaft is contacted by gas so as to increase the liquid in the housing and re-establish the liquid contact of such second portion.

4. In a gas turbine, or the like, which includes a shaft having a first peripheral portion normally contacted by a gas and having a second peripheral portion normally contacted by a liquid, the combination of: a line for supplying a liquid to the turbine; a solenoid-operated valve in said line; and a moisture-sensitive element mounted on one of the abovementioned peripheral portions of the shaft for actuating the solenoid-operated valve for any change between a gas contact and a liquid contact of said one of the peripheral portions of the shaft.

5. In a gas turbine, or the like, which includes a shaft having a first peripheral portion normally contacted by a gas and having a second peripheral portion normally contacted by a liquid, the combination of: a line for supplying a liquid to the turbine; a solenoid-operated valve in said line; a relay for controlling the energization of said solenoid-operated valve to open said valve whenever the current through said relay drops below a threshold value; and a moisture-sensitive element mounted on the second peripheral portion of the shaft, said element including a resistor connecting said relay to an energizing source, the resistance of said resistor increasing whenever the moisture-sensitive element is not covered by the liquid so as to decrease the current through the relay below said threshold valve and open said solenoid-operated valve until the liquid contact of the second peripheral portion of the shaft is restored.

6. A control system for controlling the supply of a liquid through a line to a gas turbine or the like, which turbine includes a shaft having a first portion normally contacted by a gas and a second portion normally contacted by the liquid, said control system including in combination: a solenoid-operated valve in the aforementioned line; and a moisture-sensitive element mounted on one of the abovementioned portions of the shaft for actuating the solenoid-operated valve for any change between a gas contact and a liquid contact of said one of the portions of the shaft.

7. A control system for controlling the supply of a liquid through a line to a gas turbine or the like, which turbine includes a shaft having a first portion normally contacted by a gas and a second portion normally contacted by the liquid, said control system including in combination: a solenoid-operated valve in the above-mentioned line; a relay for controlling the energization of said solenoid-operated valve to open said valve whenever the current through said relay drops below a threshold value; and a moisture-sensitive element mounted on the second portion of the shaft, said element including a resistor connecting said relay to an energizing source, the resistance of said resistor increasing whenever the moisture-sensitive element is not covered by the liquid so as to decrease the current through the relay below said threshold value and open said solenoid-operated valve until the liquid contact of the second portion of the shaft is restored.

8. A control system for controlling the supply of a liquid to a gas turbine or the like, which turbine includes a member having a first portion normally contacted by gas and a second portion normally contacted by liquid, said control system including: control means for controlling the application of liquid from the line to the turbine, and means mounted on one of said portions of the turbine member for actuating said control means for any changes between a gas contact and a liquid contact on said one of said portions of the turbine member.

No references cited.